United States Patent
Merkin et al.

(10) Patent No.: US 6,772,099 B2
(45) Date of Patent: Aug. 3, 2004

(54) SYSTEM AND METHOD FOR INTERPRETING SENSOR DATA UTILIZING VIRTUAL SENSORS

(75) Inventors: Cynthia M. Merkin, Georgetown, TX (US); Donald W. Gerhart, Salado, TX (US); Wayne R. Weilnau, Jr., Austin, TX (US); Allen M. Blanton, Jr., Pflugerville, TX (US); Philip D. Chidester, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 30 days.

(21) Appl. No.: 10/338,309

(22) Filed: Jan. 8, 2003

(65) Prior Publication Data

US 2004/0133398 A1 Jul. 8, 2004

(51) Int. Cl.[7] .................. G06F 19/00; G05B 13/00; G05B 17/00
(52) U.S. Cl. ............... 702/188; 702/183; 702/185; 700/52
(58) Field of Search .................. 702/188, 127, 702/85, 104, 179, 181, 182, 183, 185; 700/28, 29, 30, 32, 51, 52; 703/21, 22, 13

(56) References Cited

U.S. PATENT DOCUMENTS

| | | | |
|---|---|---|---|
| 5,406,502 A | 4/1995 | Haramaty et al. | 364/551.01 |
| 5,459,668 A | 10/1995 | Dogan et al. | 364/456 |
| 5,864,773 A | 1/1999 | Barna et al. | 702/85 |
| 6,223,214 B1 * | 4/2001 | Tufty et al. | 709/217 |
| 6,236,908 B1 | 5/2001 | Cheng et al. | 701/1 |
| 6,363,449 B1 | 3/2002 | Sides et al. | 710/129 |
| 6,496,790 B1 * | 12/2002 | Kathavate et al. | 702/188 |
| 6,519,552 B1 * | 2/2003 | Sampath et al. | 702/183 |
| 6,615,090 B1 * | 9/2003 | Blevins et al. | 700/26 |
| 6,665,425 B1 * | 12/2003 | Sampath et al. | 382/112 |
| 6,697,879 B1 * | 2/2004 | Tufty et al. | 719/316 |
| 2003/0033032 A1 * | 2/2003 | Lind et al. | 700/52 |
| 2003/0055955 A1 * | 3/2003 | Cheng et al. | 709/224 |
| 2003/0130969 A1 * | 7/2003 | Hawkins et al. | 706/15 |

OTHER PUBLICATIONS

"IPMI Intelligent Platform Management Interface Specification v1.5", at internet address http://www.intel.com.design/servers/ipml/PMv1_1.pdf, 460 Pages, Feb. 20, 2002.

* cited by examiner

Primary Examiner—Patrick J Assouad
(74) Attorney, Agent, or Firm—Baker Botts L.L.P.

(57) ABSTRACT

A system and method for interpreting sensor data utilizing virtual sensors includes a plurality of physical sensors having a sensor number, a virtual sensor repository including a plurality of virtual sensors and an event log, a management controller, and one or more agents and allows for a central repository for a plurality of sensor values and a consistent and uniform view of system health. The management controller associates each of the physical sensors with one or more of the virtual sensors utilizing the sensor numbers. The management controller further stores within each of the associated virtual sensors the sensor value from the physical sensor associated with the associated virtual sensor. The one or more agents request and receive the sensor value for a desired physical sensor from one or more of the virtual sensors located in the virtual sensor repository instead of directly from the desired physical sensor.

20 Claims, 2 Drawing Sheets

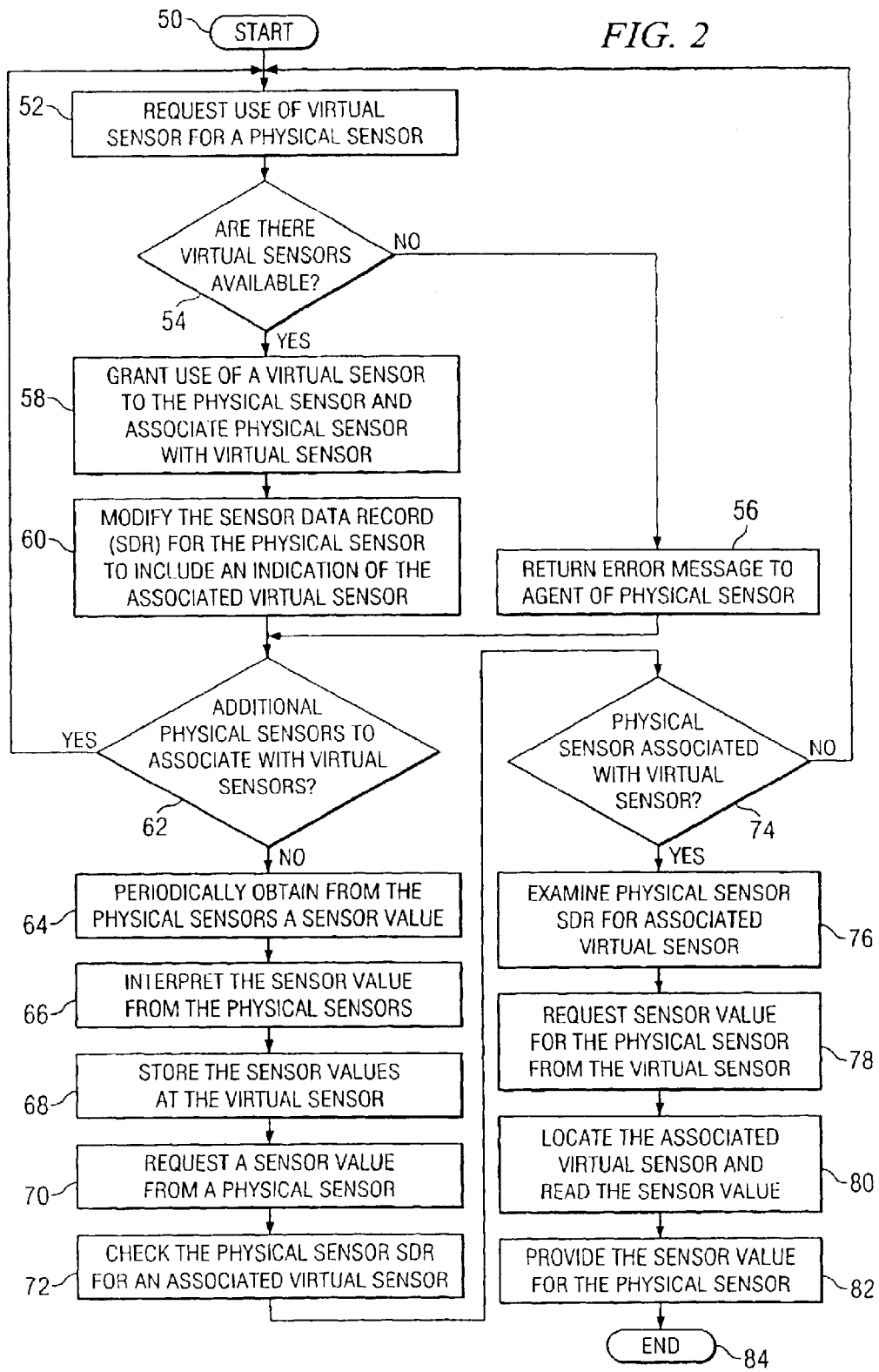

SYSTEM AND METHOD FOR INTERPRETING SENSOR DATA UTILIZING VIRTUAL SENSORS

TECHNICAL FIELD

This disclosure relates in general to the field of information handling systems, and more particularly to a system and method for interpreting sensor data utilizing virtual sensors.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems become more complex operating within lower tolerances for failure, it is increasingly important to continuously monitor the operating parameters of the components within the information handling system and any components connected to the information handling system. To assist in monitoring operation and performance, information handling systems utilize sensors. The sensors monitor such operating characteristics as temperature, voltage, current, memory, and the presence of required components. The sensors are typically physical hardware devices, such as temperature monitors or voltage monitors, that are monitored and managed by a controlling agent. For example, a BIOS may manage a memory sensor for detecting errors in memory.

The Intelligent Platform Management Interface (IPMI) specification facilitates communication between the sensors, agents, and the information handling system. The IPMI specification allows for autonomous monitoring and recovery features implemented directly into the platform management hardware and firmware of the information handling system. The platform management of the IPMI allows for the monitoring and controlling of functions that are built in to the information handling system hardware and primarily used for the purpose of monitoring system health including such elements as system temperatures, voltages, fans, power supplies, bus errors, and system physical security. The monitoring and recovery control functions of the IPMI are independent of the information handling system's main processor, BIOS, and operating system through the use of a micro-controller such as a baseboard management controller ("BMC"). The BMC provides the intelligence behind IPMI and the ability for other agents, such as the BIOS or a RAID controller, to access the IPMI system. This allows for a standardized way of integrating information handling system features with the baseboard of the IPMI specification.

The IPMI and the BMC include associated sensors that monitor the health of the IPMI within the information handling system. Additional sensors exist outside of the IPMI that are managed by other software and/or hardware components or agents, such as the BIOS, of the information handling system. The IPMI specification addresses how sensor readings detected by the agents for sensors outside of the IPMI can be logged by the IPMI into a system event log ("SEL"). But there is no standard way to model a sensor, either within the IPMI or outside the IPMI, so that the current status of each sensor can be shared among the BMC and the multiple agents such as the BIOS, firmware, OpenManage, and diagnostics.

The various agents in the information handling system access and parse the SEL of the BMC in an attempt to retrieve the significant events that have happened in the system. In addition, when an agent desires a current sensor reading or value, the agent directly accesses the sensor in order to retrieve the current sensor value. Because the sensors contain raw data, each agent must interpret the current sensor data using the agent's own interpretation rules. Therefore, each agent may differently interpret the same sensor value for a single sensor. Each agent also interprets the data in the SEL using the agent's own interpretation rules resulting in different analysis of the same data by each agent. Each agent differently interpreting the sensor data leads to different and inconsistent views of system health depending upon which agent system health is viewed through.

For both sensors inside and outside of the IPMI, the BMC utilizes the SEL as a historical log of what has happened in the past with respect to the sensors. The agents communicate with the BMC and the SEL to determine what has happened historically with respect to the information handling system. But there is no central repository for the most current sensor readings for sensors both inside and outside the IPMI. If an agent desires the status for two different sensors, the agent must individually access each of the sensors and interpret the sensor data to determine the current status of the two sensors. Having to access each sensor individually to determine the current status for each sensor is an inefficient use of processing resources and does not allow for a centralized and unified way to indicate the current operating status of the information handling system.

SUMMARY

Therefore, a need has arisen for a system and method for interpreting sensor data in a consistent and unified manner.

A further need has arisen for a system and method for interpreting sensor data utilizing virtual sensors that provides for a central repository for sensor values.

In accordance with the teachings of the present disclosure, an information handling system and method for interpreting sensor data utilizing virtual sensors are described which substantially eliminate or reduce disadvantages with previous systems and methods for interpreting sensor data. A plurality of virtual sensors allow for a central repository for sensor values from a plurality of physical sensors which results in the consistent and uniform interpretation of the sensor values.

In accordance with one aspect of the present disclosure, an information handling system is provided. The information handling system includes a plurality of physical sensor. A plurality of virtual sensor are associated with the physical sensors and are disposed within a virtual sensor repository. A management controller associates each one of the physical sensors with a virtual sensor within the virtual sensor repository. Additionally, the management controller stores a sensor value from each physical sensor within the associated virtual sensor. The information handling system further includes one or more agents that request sensor values for desired physical sensors from the associated virtual sensors instead of the desired physical sensors and receive the sensor values from the virtual sensors.

More specifically, each physical sensor has a sensor number. The management controller uses the sensor numbers for the physical sensors to associate each physical sensor with a virtual sensor. The management controller obtains the sensor values from the physical sensors, interprets the sensor values in a uniform manner, and stores the sensor values in the virtual sensors. When one of the agents desires a sensor reading or sensor value for a desired physical sensor, the agent accesses information regarding the desired physical sensor to determine if the desired physical sensor is associated with one or more virtual sensors. If the desired physical sensor is associated with a virtual sensor, the agent requests the sensor value for the desired physical sensor from the associated virtual sensor. The management controller provides the sensor value for the desired physical sensor to the requesting agent. In addition, the management controller maintains within the virtual sensor repository an event log which is a historical record of the sensor values for the physical sensors associated with the virtual sensors.

In another aspect of the present disclosure, the physical sensors are associated with the virtual sensors. The agent monitoring a physical sensor not associated with a virtual sensor requests from the management controller that the physical sensor become associated with one of the virtual sensors. The management controller receives the request and determines if there are virtual sensors available for use by the requesting physical sensor. If there are available virtual sensors, the management controller grants to the physical sensor use of one or more of the virtual sensors and associates the physical sensor with the virtual sensor. A sensor data record for the physical sensor is modified to include an indication that the physical sensor is associated with a virtual sensor and that any sensor values for the physical sensor should be obtained from the associated virtual sensor and not the physical sensor.

The present disclosure provides a number of important technical advantages. One important technical advantage is that the sensor values for the physical sensors are interpreted and stored in a consistent and uniform manner. This allows for an accurate representation of the health of the information handling system. Because the management controller interprets the sensor values for all physical sensors, all physical sensor readings are in the same format and interpreted in the same fashion instead of numerous agents differently interpreting the physical sensor values. Since the sensor values stored in the virtual sensor repository are all interpreted by the management controller, each agent requesting the sensor value for the same physical sensor will receive the same interpreted sensor value and the agents will not have to interpret the sensor values using the agents' own interpretation rules. Agents no longer have to interpret sensor values and each agent receives the same sensor value resulting in consistent views of system health.

Another important technical advantage of the present disclosure is that the virtual sensor repository allows for a centralized location for all sensor values providing a current status for each of the physical sensors. Because a central component, the management controller, obtains and interprets the sensor values from the physical sensors and stores the sensor values in the virtual sensor repository, the agents only have to access the virtual sensor repository instead of each physical sensor to obtain sensor values. An agent wanting to determine the current operating status of the information handling system need only access the virtual sensor repository in order to obtain such information. In addition, the current status of the system can be determined more quickly and more efficiently by an agent because the agent only needs to access the virtual sensor repository instead of every physical sensor within the information handling system.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 depicts a method of interpreting sensor data utilizing virtual sensors.

DETAILED DESCRIPTION

Figure 1:
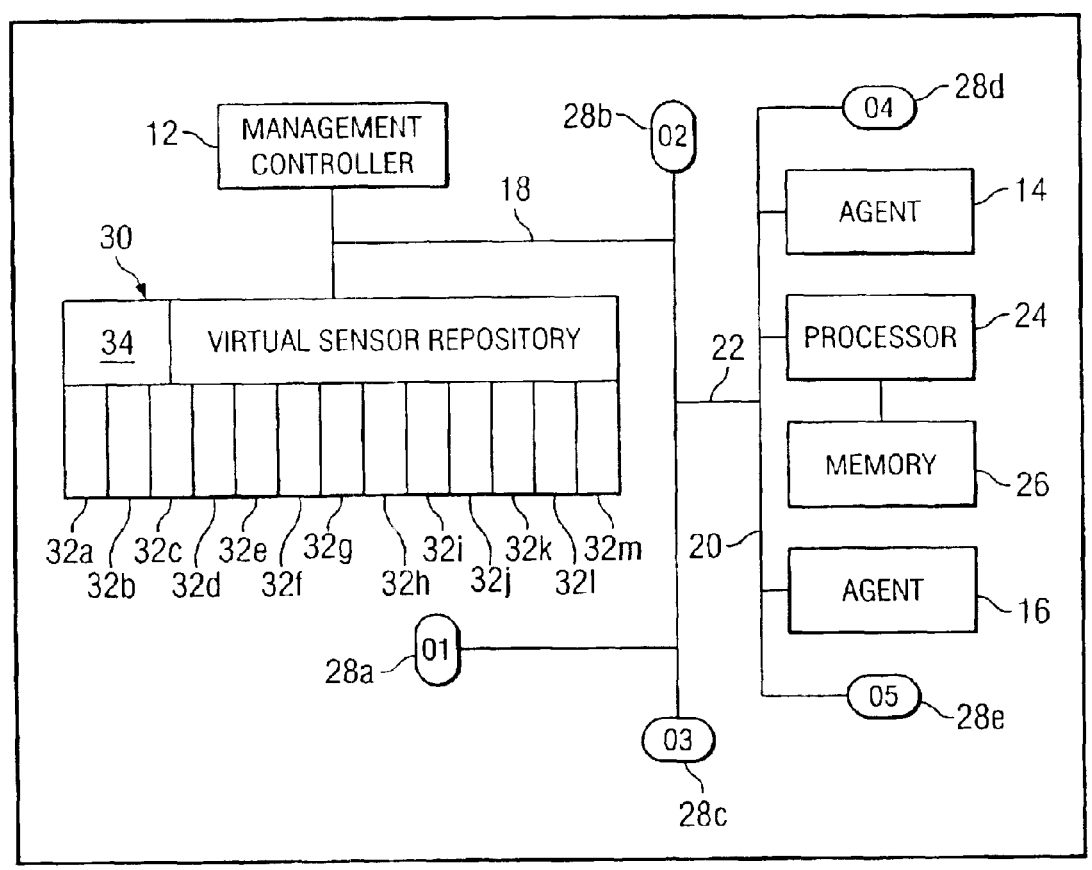
FIG. 1 illustrates a block diagram of an example information handling system.

Preferred embodiments and their advantages are best understood by reference to the figures, wherein like numbers are used to indicate like and corresponding parts.

Previous systems and method for interpreting sensor data have been designed so that each physical sensor acts independently. In order to determine system health, each physical sensor must be individually accessed and the sensor data interpreted by the agent accessing the physical sensor. Because each agent independently interprets the sensor values using its own interpretation rules, the same sensor values may he interpreted differently by different agents which may result in conflicting views of system health. In addition, previous systems and methods have included only a repository for historical sensor data or sensor values and have not included a central repository for current physical sensor values. The present disclosure allow for a system and method of interpreting sensor data including a central repository for current sensor values as well as unified and consistent interpretations of sensor values by a single entity, a management controller.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 illustrates a block diagram of information handling system 10. Information handling system 10 includes management controller 12 and agents 14 and 16. In the example embodiment, information handling system 10 may further include respective software components and hardware components, such as processor 24 and memory 26. These components communicate and work together via bus 18, bus 20, and bridge 22. The various hardware and software components may also be referred to as processing resources.

Management controller 12 is a micro-controller and may be the baseboard management controller ("BMC") when information handling system 10 is operating under the IPMI specification. Management controller 12 is awake at all times and therefore available in-band when an operating system is running and when the BIOS is booting and also available out-of-band. Agents 14 and 16 are additional hardware, software, or firmware controllers such as BIOS, RAID controllers, system diagnostics, OpenManage, or any other appropriate controller. Agents 14 and 16 monitor and/or control the functionality of various components within information handling system 10. Information handling system 10 shown in FIG. 1 includes two agents while alternate embodiments of information handling system 10 may include more than two or less than two agents.

Agent 14 and agent 16 communicate with each other via bus 20 while management controller 12 communicates with agents 14 and 16 via bus 18 and bridge 22. Under the IPMI specification, bus 18 may be built on a I²C based serial bus and is the Intelligent Platform Management Bus ("IPMB") that interconnects management controller 12 with information handling system 10 electronics and further provides a communication media for system platform management information. Bridge 22 provides a communication connection between management controller 12 on bus 18 and agents 14 and 16 on bus 20 thereby allowing components on different buses to communicate.

Information handling system 10 further includes physical sensors 28a, 28b, 28c, 28d, and 28e. The embodiment shown in FIG. 1 shows five physical sensors 28 while alternate embodiments may include less than five or more than five physical sensors. Physical sensors 28 are hardware components and measure such operating characteristics as temperature, current, voltage, power supplies, fans, memory, or any other appropriate operating parameters that affects performance. For instance, physical sensor 28a may measure the voltage levels of information handling system 10, physical sensor 28b may measure temperature levels for information handling system 10, physical sensor 28c may measure cooling fan presence and operation, physical sensor 28d may measure hard disk drive presence and operation, and physical sensor 28e may detect errors in memory.

Physical sensors 28 may be linear, non-linear, discrete, or threshold sensors. Linear sensors return sensor values that can be converted to the desired sensor units, such as temperature or voltage, using a linear conversion formula. Non-linear sensors cannot be linearized using one of the predetermined linearization formula or do not have constant conversion factors over the range of sensor values. Discrete physical sensors have sensor values that consist of a number of individual states. Threshold physical sensors have sensor values that include a current sensor reading and any associated thresholds for the physical sensor.

Each physical sensor 28 has an owner that monitors and manages the physical sensor. Agent 16 is the owner of physical sensor 28e, agent 14 is the owner of physical sensor 28d, and physical sensors 28a, 28b, and 28c fall under the control of management controller 12. For instance, agent 16 may be the BIOS and physical sensor 28e may be a memory sensor that detects errors and malfunctions in the memory and agent 14 may be a RAID controller and physical sensor 28d detects errors in the hard disk drives managed by agent 14 and detects if one of the hard disk drives is not connected to information handling system 10.

In addition to an owner, each physical sensor 28 also has a sensor number to aid in the identification of physical sensors 28. As shown in FIG. 1, physical sensor 28a has a sensor number of "01," physical sensor 28b has a sensor number of "02," physical sensor 28c has a sensor number of "03," physical sensor 28d has a sensor number of "04," and physical sensor 28e has a sensor number of "05." Management controller 12 and agents 14 and 16 refer to physical sensors 28 by the sensor numbers and request sensor values from physical sensor 28 using the sensor numbers. The sensor number for each of physical sensors 28 are defined by the IPMI specification. Additionally, use of the sensor numbers for physical sensor 28 identification reduces data space requirements since only the sensor numbers need to be stored for physical sensor 28 identification.

Each physical sensor 28 also includes a sensor data record ("SDR"). The SDR is a data record that provides information regarding physical sensors 28 such as sensor type, sensor location, event generation, access information, sensor threshold support, and information on what types of readings the sensor provides. For instance, the SDR for physical sensor 28b may include such information as that physical sensor 28b monitors the temperature of information handling system 10, the location of physical sensor 28b within information handling system 10, and that it is a linear discrete physical sensor. The purpose of the SDR is to describe the physical sensor configuration to management controller 12 and agents 14 and 16. The SDR may also include information that identifies the owner of physical sensors 28.

Under previous systems and methods for interpreting sensor data, when management controller 12 or agents 14 or 16 wanted to determine a current operating parameter utilizing one of physical sensors 28, the physical sensor 28 was directly accessed by management controller 12 or one of agents 14 or 16. For example, agent 16 wants to determine the overall operating temperature of information handling system 10 which is determined by physical sensor 28b. Therefore, agent 16 directly accesses physical sensor 28b and reads the sensor value for physical sensor 28b, where the sensor value is the current sensor reading for physical sensor 28b. Once agent 16 obtains the sensor value, agent 16 interprets the sensor value in order to determine the operating temperature. In interpreting the sensor value, agent 16 utilizes its own interpretation rules and arrives at a temperature value for the current operating temperature of information handling system 10.

At the same time, management controller 12 may also be interested in the current operating temperature of information handling system 10. But management controller 12, as well as agent 14, are unaware that agent 16 has accessed physical sensor 28b and already determined the current operating temperature because agent 16 has no way of communicating the interpreted sensor value to management controller 12 and agent 14. So management controller 12 accesses physical sensor 28b, obtains the sensor value, and interprets the sensor value using the interpretation rules for management controller 12 to determine the current operating temperature. But because management controller 12 and agent 16 may have different interpretation rules for interpreting sensor values, management controller 12 and agent 16 may arrive at different operating temperatures. For instance, management controller 12 may show that information handling system 10 is operating at a satisfactory temperature while agent 16 may determine that information handling system 10 is operating at too hot of a temperature. The result is conflicting interpretations as to the current operating temperature and therefore information handling system 10 does not know the correct current operating system.

The present disclosure provides for a central repository of sensor values and removes the need to continually access physical sensors to obtain sensor values through virtual repository 30 and virtual sensors 32. Virtual sensors 32a–32m are disposed within virtual sensor repository 30. Information handling system 10 shown in the embodiment of FIG. 1 includes thirteen virtual sensors 32 but in alternate embodiments may include less than thirteen or more than thirteen virtual sensors. In addition, the number of virtual sensors 32 does not need to be the same as the number of physical sensors 28 and there can be more or less physical sensors 28 then there are virtual sensors 32. Each virtual sensor 32 within virtual sensor repository 30 is a memory or storage location that has been portioned out by management controller 12. Each virtual sensor 32, or memory location, is large enough to hold a sensor value from one of physical sensors 28. Virtual sensor repository 30 further includes event log 34, a non-volatile storage area, which stores non-current or historical sensor values for physical sensors 28 for later retrieval. Event log 34 provides historical performance information in the event of a malfunction or error with information handling system 10.

FIG. 2 illustrates a flow diagram of one embodiment of a method for interpreting sensor data utilizing virtual sensors. The method begins at step 50 and at step 52 one of agents 14 or 16 requests from management controller 12 use of one or more of virtual sensor 32 for physical sensor 28d or 28e. Management controller 12 publishes an interface that identifies that management controller 12 and information handling system 10 supports virtual sensors which allows agents 14 and 16 to make the request to management controller 12. Before information handling system 10 can take advantage of virtual sensors 32, each physical sensor 28 must be associated with one of virtual sensors 32. For instance, agent 14 requests from management controller 12 use of one or more of virtual sensors 32 for physical sensor 28d and agent 16 requests from management controller 12 use of one or more of virtual sensors 32 for physical sensor 28e. Agents 14 and 16 may make the request to use one or more of virtual sensors 32 using the "Add SDR" command.

When agent 16 requests use of one of virtual sensors 32 from management controller 12, management controller 12 at step 54 checks virtual sensor repository 30 to determine if there are any available virtual sensors 32 to associate with physical sensor 28e at step 54. Virtual sensors 32 are available if they have not already been associated with another physical sensor 28 and therefore are not storing any sensor values. If at step 54 management controller 12 determines that there are no available virtual sensors 32, then at step 56 management controller 12 informs agent 16 that there are no available virtual sensors 32 and may provide an error message to both information handling system 10 and the user of information handling system 10 stating that a request to associate a physical sensor with a virtual sensor cannot be fulfilled because there are no available virtual sensors. The decision can then be made to leave physical sensor 28e unassociated with any virtual sensors 32 or reconfigure virtual sensor 32 associations to proceed to step 62, make room for an association of physical sensor 28e within virtual sensor repository 30.

If at step 54 management controller 12 determines that there are virtual sensors 32 available, then at step 58 management controller 12 associates one of virtual sensors 32 with the requesting physical sensor 28. For instance, with physical sensor 28e, management controller 12 associates physical sensor 28e with virtual sensor 32e. Management controller 12 utilizes the sensor numbers for physical sensors 28 to associate physical sensors 28 with virtual sensors 32. Virtual sensor 32e has no knowledge regarding physical sensor 28e including what parameter physical sensor 28e monitors. Virtual sensor 32e only recognizes that it is associated with physical sensor number "05" and that it will store the sensor values for sensor number "05."

When associating physical sensors 28 to virtual sensors 32, management controller 12 assigns a range of storage to virtual sensors 32 to hold the sensor values for the associated physical sensors 28. For a discrete physical sensor 28, the stored sensor values consist of a number of individual states and for threshold physical sensors 28, the stored sensor values include the current sensor value and any thresholds associated with the threshold physical sensor. A physical sensor 28 may be associated with more than one virtual sensor 32 if the sensor value for the physical sensor 28 is larger than the storage capacity of one virtual sensor 32. For example, physical sensor 28e may be a threshold sensor so that the sensor value for physical sensor 28e includes the current sensor reading, a low threshold value, an operating threshold value range, a high threshold value, and a shutdown threshold value. The current sensor reading and the four threshold values may be more information than can be stored by one virtual sensor 32. Therefore, physical sensor 28e may be associated with more than one virtual sensor 32 such that virtual sensor 32e holds the current sensor reading while virtual sensor 32f holds the four threshold values.

Once physical sensor 28 has been associated virtual sensor 32 within virtual sensor repository 30, at step 60 management controller 12 modifies or updates the SDR for physical sensor 28 to include an indication that physical sensor 28 is associated with one or more virtual sensors 32. For example, physical sensor 28e is associated with virtual sensor 32e. Management controller 12 modifies the SDR for physical sensor 28e to include an indicator or indication that physical sensor 28e is associated with virtual sensor repository 30 and specifically associated with virtual sensor 32e. This indication informs any agent desiring a sensor value from physical sensor 28e to access virtual sensor repository 30 and virtual sensor 32e instead of physical sensor 28e to obtain the sensor value.

When physical sensor 28 has been associated with one or more virtual sensors 32 and management controller 12 modifies the SDR for physical sensor 28, at step 62 management controller 12 checks if it has received any additional requests from agents 14 or 16 to associated physical sensors 28 with one or more virtual sensors 32. If at step 62 agent 14 desires to associate physical sensor 28d with one or more virtual sensors 32, then the process returns to step 52 and step 52 through step 62 are repeated as described above so that physical sensor 28d becomes associated with one or more virtual sensors 32. If at step 62 there are no additional requests to associate a physical sensor 28 with a virtual sensor 32, then the process continues to step 64. Once all physical sensors 28 are associated with virtual sensors 32, step 52 through step 62 do not have to repeated unless a new physical sensor is added to information handling system 10 or if the association between physical sensors 28 and virtual sensors 32 changes for any reason.

For physical sensors 28a, 28b, and 28c within the control of management controller 12, management controller 12 checks for available virtual sensors 32 and if there are available virtual sensors 32, associates physical sensors 28a, 28b, and 28c with virtual sensors 32a, 32b, and 32c, respectively in the same process as described above for physical sensors 28d and 28e. Management controller 12 further modifies the SDR for each of physical sensors 28a, 28b, and 28c to include the indicator that physical sensors 28a, 28b, and 28c are associated with virtual sensors 32a, 32b, and 32c, respectively.

In alternate embodiments, information handling system 10 may include default virtual sensors which include pre-programmed associations between particular physical sensors and virtual sensors for physical sensors that are standard and included in every information handling system. For instance, every information handling system may require a temperature sensor such as physical sensor 28b to monitor the operating temperature. Because every information handling system may include physical sensor 28b for temperature readings, information handling system 10 may come from the factory pre-programmed with physical sensor 28b already associated with virtual sensor 32b so that the association and initialization process of an agent requesting use of a virtual sensor does not have to occur.

Once physical sensors 28 have been associated with virtual sensors 32, at step 64 management controller begins automatically and periodically obtaining sensor values from physical sensors 28 associated with virtual sensors 32. Management controller 12 may obtain the sensor values from physical sensors 28 in several ways. For instance, physical sensors 28 may be slave devices whereby management controller 12 periodically polls each physical sensor 28 for the sensor values. The rate of polling may be different for each physical sensor 28 and varies according to physical sensor type and the operating parameters physical sensors 28 monitor. For example, physical sensor 28b monitors operating temperature and therefore determines a new operating temperature every five seconds while physical sensor 28e monitors memory performance and only takes a sensor reading when a memory module experiences an error. Because physical sensor 28b constantly determines the operating temperature and information handling system 10 can overheat if the temperature becomes too high, management controller 12 may poll physical sensor 28b for sensor value at a greater rate than management controller 12 polls physical sensor 28e for sensor values.

Management controller 12 may also request the sensor values from physical sensors 28 at a predetermined rate and in response to the request, physical sensors 28 transmit the sensor values to management controller 12. Alternatively, physical sensors 28 may not be slave devices but instead periodically provide sensor values to management controller 12 without management controller 12 requesting the sensor values. Furthermore, management controller 12 obtaining sensor values from physical sensors 28 may be based on changes in the sensor state of physical sensors 28. For instance, agent 16, owner of physical sensor 28e, may detect a change in the sensor state of physical sensor 28e when physical sensor 28e detects an error in memory. When agent 16 detects the change in sensor state of physical sensor 28e, agent 16 sends a "Set Sensor Reading" command to management controller 12 which includes the sensor value for physical sensor 28e.

After management controller 12 obtains the sensor values from physical sensors 28, at step 66 management controller 12 interprets the sensor values according to a single set of interpretation rules. Management controller 12 interpreting the sensor values using one set of interpretation rules instead of each of the agents within information handling system 10 using different interpretation rules to interpret the sensor values allows for a consistent and unified view of system health independent of where system health is viewed.

At step 68, management controller 12 stores the sensor values from physical sensors 28 in the respective virtual sensors 32. For example, management controller 12 stores the sensor values for physical sensor 28a in virtual sensor 32a, for physical sensor 28b in virtual sensor 32b, for physical sensor 28c in virtual sensor 32c, for physical sensor 28d in virtual sensor 32d, and for physical sensor 28e in virtual sensor 32e. Management controller 12 stores only the most current sensor value in virtual sensors 32.

Management controller 12 stores historical sensor values in event log 34 so that whenever a virtual sensor 32 receives a new sensor value, the sensor value currently in virtual sensor 32 is removed to event log 34. For example, virtual sensors 32a, 32b, 32c, 32d, and 32e each contain a sensor value for the respective physical sensors 28. Management controller 12 obtains new sensor values for physical sensors 28a and 28d and stores the new sensor values in virtual sensor 32a and virtual sensor 32d. The sensor values presently stored in virtual sensors 32a and 32d are removed to event log 34 to make room for the new sensor values and to create a history log of sensor values. As management controller 12 obtains new sensor values, the old sensor values are removed from virtual sensors 32 to event log 34. Therefore, if information handling system 10 experiences an error, a user as well as agents 14 and 16 and management controller 12 has access to previous sensor values for each of physical sensor 28 to help in diagnosing the source of the error and correcting the error.

Agents 14 or 16 or management controller 12 requests a sensor value from one of physical sensors 28 at step 70. Agent 14 or 16 issues a "Get Sensor Reading" command in order to request a sensor value from one of physical sensors 28. For example, agent 16 may require the operating temperature of information handling system 10 and therefore issue a "Get Sensor Reading" command for physical sensor 28b. Agent 16 requests the sensor value by calling out the desired physical sensor using the sensor number in the command. Therefore, agent 16 issues the command, "Get Sensor Reading for Sensor 02." When agent 16 issues the command, at step 72 agent 16 checks the SDR for physical sensor 28b to see if there is an indicator within the SDR that physical sensor 28b is associated with one of virtual sensors 32. If there is no indicator at step 74, then the process returns to step 52 so that the physical sensor that is not associated with any virtual sensors 32 may become associated with virtual sensors 32.

If at step 74 the SDR for the desired physical sensor 28, here physical sensor 28b, includes an indication that physical sensor 28b is associated with one or more virtual sensors 32, then at step 76 agent 16 reads the SDR to learn which virtual sensor 32 the desired physical sensor is associated with. For instance, the SDR for physical sensor 28b reveals that the physical sensor 28b is associated with virtual sensor 32b. In alternate embodiments, when agent 16 issues the "Get Sensor Reading" command, management controller 12, instead of agent 16, may access the SDR for the desired physical sensor, search the SDR for an indication of the desired physical sensor being associated with one or more virtual sensors 32, and if such indicator is located, determine which virtual sensor 32 the desired physical sensor is associated with.

Once the associated virtual sensor 32 is located for physical sensor 28b, at step 78 agent 16 requests the sensor value stored in virtual sensor 32b for physical sensor 28b. Management controller 12 searches virtual sensor repository 30 for virtual sensor 32b, locates virtual sensor 32b, and reads the sensor value stored in virtual sensor 32b at step 80. Once management controller 12 has obtained the sensor value from virtual sensor 32b, at step 82 management controller provides the sensor value for physical sensor 28b to agent 16.

Because agent 16 is obtaining the sensor value from virtual sensor repository 30, which has been interpreted by management controller 12, instead of directly from physical sensor 28b and then having to interpret the sensor value, the system health is viewed in a consistent and unified manner regardless of the interface through which agent 16 accesses physical sensor 28b. Alternatively, agent 16 may directly access virtual sensor repository 30 and virtual sensor 32b in order to retrieve the sensor value for physical sensor 28b instead of going through management controller 12. Once agent 16 retrieves the sensor value for physical sensor 28b, the method ends at step 84. Step 64 through step 82 may be repeated as many times as necessary whenever agents 14 or 16 or management controller 12 request a sensor value for one of physical sensors 28 associated with one of virtual sensors 32.

In addition to a central repository for current sensor values and sensor values presented in a consistent and uniform manner, the present disclosure provides the further advantage of the above described method occurring with the documented industry standard of the IPMI specification. In addition, virtual sensors 32 and event log 34 maintain their states regardless of the clearing of information handling system 10 so the sensor values in virtual sensors 32 and event log 34 provide a truer and more accurate representation of any errors that have occurred within information handling system 10.

Although the disclosed embodiments have been described in detail, it should be understood that various changes, substitutions and alterations can be made to the embodiments without departing from their spirit and scope.

What is claimed is:

1. An information handling system comprising:
 a plurality of physical sensors each having a sensor umber;
 a plurality of virtual sensors associated with the physical sensors, the virtual sensors disposed within a virtual sensor repository;
 a management controller associated with the virtual sensors, the management controller operable to associate each of the physical sensors with one or more of the virtual sensors within the virtual sensor repository utilizing the sensor numbers and store within the associated virtual sensor a sensor value from the associated physical sensor; and
 one or more agents associated with the management controller and the physical sensors, the agents operable to request and receive the sensor value for a desired physical sensor from the associated virtual sensors instead of the desired physical sensor.

2. The information handling system of claim 1 wherein each of the physical sensors includes a sensor data record including:
 a description of the physical sensor; and
 an indicator informing the agents to access the virtual sensor repository instead of the physical sensor in order to locate the sensor value and which one or more of the virtual sensors correspond with the physical sensor.

3. The information handling system of claim 1 wherein the management controller interprets and stores the sensor values from each of the physical sensors in a consistent and unified format.

4. The information handling system of claim 1 wherein the management controller periodically polls the physical sensors to obtain the sensor values for each of the physical sensors.

5. The information handling system of claim 1 wherein the physical sensors periodically provide to the management controller the sensor values to be stored within the virtual sensors of the virtual sensor repository.

6. The information handling system of claim 1 wherein the management controller maintains within the virtual sensor repository an event log, the event log including more than one of the sensor values for each of the physical sensors.

7. The information handling system of claim 1 wherein the management controller obtains the sensor value from the associated virtual sensor in the virtual sensor repository when the agent requests the sensor value for the desired physical sensor.

8. The information handling system of claim 7 wherein the management controller transmits the sensor value for the desired physical sensor to the requesting agent.

9. A method for interpreting sensor values utilizing virtual sensors, the method comprising:
 associating one or more physical sensors with one or more virtual sensors, the virtual sensors located within a virtual sensor repository;
 obtaining from each of the physical sensors a sensor value;
 storing in each of the associated virtual sensors the sensor value from each of the associated physical sensors;
 requesting the sensor value for a desired physical sensor from the virtual sensor repository instead of the desired physical sensor; and
 providing the sensor value stored in the virtual sensor as the sensor value for the desired physical sensor.

10. The method of claim 9 wherein associating the physical sensors with the virtual sensors comprises correlating a sensor number for each of the physical sensors with a corresponding virtual sensor within the virtual sensor repository.

11. The method of claim 9 wherein providing the sensor value stored in the virtual sensor comprises providing the sensor values in a unified format.

12. The method of claim 9 wherein requesting the sensor value comprises determining that the desired physical sensor is associated with one of the virtual sensors within the virtual sensor repository.

13. The method of claim 9 further comprising adding to a sensor data record for each of the physical sensors associated with the virtual sensors an indicator providing information regarding the association of the physical sensor with one or more of the virtual sensors and which of the virtual sensors corresponds with the physical sensor.

14. The method of claim 9 further comprising maintaining within the virtual sensor repository an event log, the event log including more than one sensor value for each of the physical sensors.

15. The method of claim 9 wherein associating the physical sensors with the virtual sensors comprises:
   requesting for one of the physical sensors use of one or more of the virtual sensors within the virtual sensor repository;
   determining if there are virtual sensors available for use by the requesting physical sensor; and
   granting use of one or more of the virtual sensors to the requesting physical sensor if there are virtual sensors available.

16. The method of claim 9 wherein obtaining from each of the physical sensors a sensor value comprises periodically polling each of the physical sensors to obtain the sensor values.

17. The method of claim 9 wherein obtaining from each of the physical sensors a sensor value comprises periodically providing to a management controller the sensor values to be stored in the virtual sensors of the virtual sensor repository.

18. A method for associating physical sensors with virtual sensors, the method comprising:
   requesting for a physical sensor use of one or more virtual sensors within a virtual sensor repository;
   determining if there are virtual sensors available for use by the requesting physical sensor;
   granting use of one or more of the virtual sensors to the requesting physical sensor if there are virtual sensors available;
   modifying a sensor data record for the requesting physical sensor so that the sensor data record includes an indication that the requesting physical sensor is associated with one or more of the virtual sensors.

19. The method of claim 18 further comprising storing a sensor value for the physical sensor in the associated one or more of the virtual sensors.

20. The method of claim 19 further comprising providing the sensor value stored in the one or more virtual sensors when an agent requests the sensor value for the physical sensor.

* * * * *